(12) United States Patent
Best et al.

(10) Patent No.: US 8,544,876 B2
(45) Date of Patent: Oct. 1, 2013

(54) INFLATABLE BOLSTER

(75) Inventors: Michael James Best, Newmarket (CA); Raj S. Roychoudhury, Bloomfield Hills, MI (US); Rimas Ciplijauskas, Etobicoke (CA); Babak Fana, Mississauga (CA)

(73) Assignee: Salflex Polymers Ltd., Weston, Ontario (CA)

( * ) Notice: Subject to any disclaimer, the term of this patent is extended or adjusted under 35 U.S.C. 154(b) by 228 days.

(21) Appl. No.: 12/937,100

(22) PCT Filed: Apr. 14, 2009

(86) PCT No.: PCT/CA2009/000475
§ 371 (c)(1),
(2), (4) Date: Jan. 26, 2011

(87) PCT Pub. No.: WO2009/124394
PCT Pub. Date: Oct. 15, 2009

(65) Prior Publication Data
US 2011/0115201 A1    May 19, 2011

Related U.S. Application Data

(60) Provisional application No. 61/044,294, filed on Apr. 11, 2008.

(51) Int. Cl.
*B60R 21/231* (2006.01)
(52) U.S. Cl.
USPC ..................................... 280/730.1; 280/753
(58) Field of Classification Search
USPC .............................. 280/730.1, 753
See application file for complete search history.

(56) References Cited

U.S. PATENT DOCUMENTS

| 2,834,606 A | 5/1958 | Bertrand |
| 3,185,497 A | 5/1965 | Lagace |

(Continued)

FOREIGN PATENT DOCUMENTS

| AT | 404746 | 2/1999 |
| DE | 1112266 | 8/1961 |

(Continued)

OTHER PUBLICATIONS

U.S. Appl. No. 11/560,473 Office Action dated Mar. 15, 2010.

(Continued)

*Primary Examiner* — Drew Brown
(74) *Attorney, Agent, or Firm* — Michael Best & Friedrich LLP

(57) ABSTRACT

An inflatable bolster for use in a passenger compartment of a vehicle comprises a hollow body having a first wall having a central area and a circumferential area surrounding the central area, a second wall opposite the first wall, and an air chamber formed between the first and second walls. The inflatable bolster also comprises an inflator for injecting a pressurized fluid into the air chamber which is mounted to the hollow body. The inflatable bolster also comprises a plurality of concentric extension pleats formed in the first wall. The extension pleats extend around a major part of the circumferential area. The extension pleats contact the second wall at a plurality of contact points which are distributed across the second wall. The plurality of contact points is sufficient in number to at least partially suppress audible vibration of the second wall.

5 Claims, 3 Drawing Sheets

(56) References Cited

U.S. PATENT DOCUMENTS

| | | |
|---|---|---|
| 3,473,824 A | 10/1969 | Carey et al. |
| 3,963,362 A | 6/1976 | Hollis |
| 3,981,518 A | 9/1976 | Pulling |
| 4,203,616 A | 5/1980 | Okada |
| 4,297,051 A | 10/1981 | Robinson |
| 4,362,425 A | 12/1982 | Dixon |
| 4,511,281 A | 4/1985 | Schmanski |
| 4,518,172 A | 5/1985 | Bortz et al. |
| 4,597,691 A | 7/1986 | Clarke |
| 4,721,329 A | 1/1988 | Brantman et al. |
| 4,951,963 A | 8/1990 | Behr et al. |
| 5,082,310 A | 1/1992 | Bauer |
| 5,138,721 A | 8/1992 | Spector |
| 5,273,309 A | 12/1993 | Lau et al. |
| 5,312,133 A | 5/1994 | Pietila et al. |
| 5,324,070 A | 6/1994 | Kitagawa et al. |
| 5,324,072 A | 6/1994 | Olson et al. |
| 5,364,125 A | 11/1994 | Brown et al. |
| 5,370,417 A | 12/1994 | Kelman et al. |
| 5,382,051 A | 1/1995 | Glance |
| 5,447,326 A | 9/1995 | Laske et al. |
| 5,456,490 A | 10/1995 | Carter et al. |
| 5,476,283 A | 12/1995 | Elton |
| 5,498,026 A | 3/1996 | Eckhout |
| 5,524,924 A | 6/1996 | Steffens, Jr. et al. |
| 5,533,748 A | 7/1996 | Wirt et al. |
| 5,536,043 A | 7/1996 | Lang et al. |
| 5,544,913 A | 8/1996 | Yamanishi et al. |
| 5,556,128 A | 9/1996 | Sinnhuber et al. |
| 5,567,375 A | 10/1996 | Filion et al. |
| 5,615,914 A | 4/1997 | Galbraith et al. |
| 5,630,621 A | 5/1997 | Schneider |
| 5,716,093 A | 2/1998 | Sadr |
| 5,718,449 A | 2/1998 | Numazawa et al. |
| 5,775,729 A | 7/1998 | Schneider et al. |
| 5,816,613 A | 10/1998 | Specht et al. |
| 5,845,937 A | 12/1998 | Smith |
| 5,865,468 A | 2/1999 | Hur |
| 5,927,755 A | 7/1999 | Matsuo et al. |
| D412,880 S | 8/1999 | Sadr |
| 5,931,493 A | 8/1999 | Sutherland |
| 5,957,493 A | 9/1999 | Larsen et al. |
| 5,967,594 A | 10/1999 | Ramanujam |
| 5,968,431 A | 10/1999 | Ang et al. |
| 6,032,978 A | 3/2000 | Spencer et al. |
| 6,131,950 A | 10/2000 | Schroter |
| 6,142,520 A | 11/2000 | Iino et al. |
| 6,158,766 A | 12/2000 | Kowalski |
| 6,170,871 B1 | 1/2001 | Goestenkors et al. |
| 6,193,272 B1 | 2/2001 | Aigner et al. |
| 6,203,057 B1 | 3/2001 | Spencer et al. |
| 6,213,497 B1 | 4/2001 | Spencer et al. |
| 6,231,072 B1 | 5/2001 | Pywell et al. |
| 6,250,665 B1 | 6/2001 | Sutherland et al. |
| 6,302,437 B1 | 10/2001 | Marriott et al. |
| 6,305,710 B1 | 10/2001 | Bosgeiter et al. |
| 6,336,653 B1 | 1/2002 | Yaniv et al. |
| 6,338,501 B1 | 1/2002 | Heilig et al. |
| 6,416,079 B1 | 7/2002 | Lutz et al. |
| 6,435,554 B1 | 8/2002 | Feldman |
| 6,471,242 B2 | 10/2002 | Schneider |
| 6,517,103 B1 | 2/2003 | Schneider |
| 6,536,802 B1 | 3/2003 | Sutherland et al. |
| 6,543,838 B1 | 4/2003 | Bertolini et al. |
| 6,568,743 B1 | 5/2003 | Jayasuriya et al. |
| 6,578,867 B2 | 6/2003 | Khoudari et al. |
| 6,588,557 B2 | 7/2003 | Williams et al. |
| 6,619,689 B2 | 9/2003 | Spencer et al. |
| 6,688,643 B2 | 2/2004 | Schneider |
| 6,712,385 B2 | 3/2004 | Enders |
| 6,715,789 B2 | 4/2004 | Takimoto et al. |
| 6,752,417 B2 | 6/2004 | Takimoto et al. |
| 6,758,493 B2 | 7/2004 | Conlee et al. |
| 6,817,625 B2 | 11/2004 | Hjerpe |
| 6,817,627 B2 | 11/2004 | Galmiche et al. |
| 6,848,715 B2 | 2/2005 | Nelson et al. |
| 6,874,811 B2 | 4/2005 | Enders et al. |
| 6,971,667 B2 | 12/2005 | Enders et al. |
| 6,976,706 B2 | 12/2005 | Smith et al. |
| 6,991,252 B2 | 1/2006 | Enders |
| 6,997,515 B2 | 2/2006 | Gupta et al. |
| 7,021,652 B2 | 4/2006 | Kumagai et al. |
| 7,055,083 B2 | 5/2006 | Wang |
| 7,055,853 B2 | 6/2006 | Honda et al. |
| 7,086,663 B2 | 8/2006 | Honda |
| 7,093,846 B2 | 8/2006 | Reiter et al. |
| 7,093,851 B2 | 8/2006 | Lotspih |
| 7,144,032 B2 | 12/2006 | Lunt et al. |
| 7,168,733 B2 | 1/2007 | Kumagai et al. |
| 7,213,840 B2 | 5/2007 | Kumagai |
| 7,249,781 B2 | 7/2007 | Kai et al. |
| 7,322,598 B2 | 1/2008 | Galmiche et al. |
| 7,350,852 B2 | 4/2008 | Rust et al. |
| 7,367,587 B2 | 5/2008 | Taoka |
| 7,393,013 B2 | 7/2008 | Best et al. |
| 7,396,040 B2 | 7/2008 | Enders et al. |
| 7,413,215 B2 | 8/2008 | Weston et al. |
| 7,422,234 B2 | 9/2008 | Huber et al. |
| 7,448,645 B2 | 11/2008 | Bederka et al. |
| 7,481,457 B2 | 1/2009 | Best et al. |
| 7,568,722 B2 | 8/2009 | Sato et al. |
| 7,578,518 B2 | 8/2009 | Ochiai et al. |
| 7,735,865 B2 | 6/2010 | Cappabianca et al. |
| 7,874,587 B2 | 1/2011 | Miki et al. |
| 7,980,589 B2 * | 7/2011 | Best et al. ............... 280/730.1 |
| 8,146,943 B2 | 4/2012 | Fukawatase et al. |
| 8,231,138 B2 * | 7/2012 | Sadr et al. ............... 280/730.2 |
| 2001/0054811 A1 | 12/2001 | Spencer et al. |
| 2002/0125691 A1 | 9/2002 | Conlee et al. |
| 2002/0171231 A1 | 11/2002 | Takimoto et al. |
| 2003/0127819 A1 | 7/2003 | Richardson |
| 2003/0197354 A1 | 10/2003 | Beland et al. |
| 2004/0007856 A1 | 1/2004 | Enders et al. |
| 2004/0075251 A1 | 4/2004 | Fujii et al. |
| 2004/0075252 A1 | 4/2004 | Pan |
| 2004/0099644 A1 | 5/2004 | Allen |
| 2004/0100075 A1 | 5/2004 | Sakai et al. |
| 2004/0135353 A1 | 7/2004 | Enders et al. |
| 2004/0145163 A1 | 7/2004 | Galmiche et al. |
| 2004/0155447 A1 | 8/2004 | Smith et al. |
| 2004/0163872 A1 | 8/2004 | Lincoln et al. |
| 2004/0163873 A1 | 8/2004 | Polz et al. |
| 2004/0178616 A1 | 9/2004 | Yoshikawa |
| 2004/0232666 A1 | 11/2004 | Sato et al. |
| 2005/0023802 A1 | 2/2005 | Enders et al. |
| 2005/0029781 A1 | 2/2005 | Enders et al. |
| 2005/0052005 A1 | 3/2005 | Lunt et al. |
| 2005/0052010 A1 | 3/2005 | Best et al. |
| 2005/0052011 A1 | 3/2005 | Best et al. |
| 2005/0057024 A1 | 3/2005 | Weston et al. |
| 2005/0073134 A1 | 4/2005 | Matsuura et al. |
| 2005/0098996 A1 | 5/2005 | Enders |
| 2005/0116449 A1 | 6/2005 | Enders |
| 2005/0253369 A1 | 11/2005 | Taoka |
| 2006/0214400 A1 | 9/2006 | Enders et al. |
| 2007/0007753 A1 | 1/2007 | Williams et al. |
| 2007/0052219 A1 | 3/2007 | Rust et al. |
| 2007/0108746 A1 | 5/2007 | Ochiai et al. |
| 2007/0108747 A1 | 5/2007 | Roychoudhury et al. |
| 2007/0152431 A1 | 7/2007 | Rust et al. |
| 2007/0273179 A1 | 11/2007 | Hommel et al. |
| 2007/0296187 A1 | 12/2007 | Ochiai |
| 2008/0061537 A1 | 3/2008 | Enders |
| 2008/0203714 A1 | 8/2008 | Untersinger et al. |
| 2009/0152848 A1 | 6/2009 | Sadr et al. |
| 2009/0152849 A1 | 6/2009 | Saraf et al. |
| 2009/0250915 A1 | 10/2009 | Best et al. |
| 2010/0052296 A1 | 3/2010 | Sasaki et al. |
| 2010/0194081 A1 | 8/2010 | Thomas et al. |
| 2010/0320736 A1 | 12/2010 | Traber et al. |
| 2010/0327566 A1 | 12/2010 | Matsushima |
| 2011/0109064 A1 | 5/2011 | Best et al. |
| 2011/0123739 A1 | 5/2011 | Ciplijauskas et al. |
| 2011/0133435 A1 | 6/2011 | Sadr et al. |

| | | | |
|---|---|---|---|
| 2011/0156378 | A1 | 6/2011 | Matsushima et al. |
| 2011/0198827 | A1 | 8/2011 | Roychoudhury |
| 2012/0080871 | A1 | 4/2012 | Roychoudhury |

FOREIGN PATENT DOCUMENTS

| | | |
|---|---|---|
| DE | 3737081 | 5/1989 |
| DE | 19546143 | 6/1997 |
| DE | 19858520 | 4/2000 |
| DE | 10123207 | 7/2002 |
| EP | 0274535 | 7/1988 |
| EP | 0678425 | 10/1995 |
| EP | 0684164 | 11/1995 |
| EP | 0872390 | 10/1998 |
| EP | 1426249 | 6/2004 |
| EP | 1663725 | 12/2009 |
| GB | 2272670 | 5/1994 |
| JP | 57058532 | 4/1982 |
| JP | 63-002741 | 1/1988 |
| JP | 63207744 | 8/1988 |
| JP | 282946 | 6/1990 |
| JP | 2249740 | 10/1990 |
| JP | 5016758 | 1/1993 |
| JP | 06-037011 | 5/1994 |
| JP | 7291084 | 11/1995 |
| JP | H08-258604 | 10/1996 |
| JP | 10504784 | 5/1998 |
| JP | 10512210 | 11/1998 |
| JP | H11-028998 | 2/1999 |
| JP | 11-091454 | 4/1999 |
| JP | 11334515 | 12/1999 |
| JP | 2000006751 | 1/2000 |
| JP | 2000-326810 | 11/2000 |
| JP | 2002-522286 | 7/2002 |
| JP | 2003517966 | 6/2003 |
| JP | 2004026126 | 1/2004 |
| JP | 2004182231 | 7/2004 |
| JP | 2004249960 | 9/2004 |
| JP | 2004-338677 | 12/2004 |
| JP | 2007-504050 | 3/2007 |
| JP | 2007090954 | 4/2007 |
| JP | 4083653 | 4/2008 |
| JP | 4136876 | 8/2008 |
| WO | 00/07851 | 2/2000 |
| WO | 00/50270 | 8/2000 |
| WO | 2004/071818 | 8/2004 |
| WO | 2006/132990 | 12/2006 |
| WO | 2007/056849 | 5/2007 |
| WO | 2009/124394 | 10/2009 |
| WO | 2009/124395 | 10/2009 |
| WO | 2009/124401 | 10/2009 |

OTHER PUBLICATIONS

U.S. Appl. No. 11/560,473 Office Action dated Oct. 22, 2010.
U.S. Appl. No. 11/560,473 Advisory Action dated Jan. 12, 2011.
U.S. Appl. No. 11/915,797 Office Action dated Feb. 18, 2010.
U.S. Appl. No. 11/915,797 Office Action dated Apr. 14, 2010.
U.S. Appl. No. 12/422,389 Office Action dated Mar. 17, 2010.
U.S. Appl. No. 12/422,389 Office Action dated Nov. 8, 2010.
U.S. Appl. No. 12/422,389 Advisory Action dated Jan. 24, 2011.
U.S. Appl. No. 12/422,389 Advisory Action dated Feb. 22, 2011.
Office Action in relation to U.S. Appl. No. 12/955,491, mailed on May 10, 2011.
U.S. Appl. No. 12/978,139 Office Action dated Jun. 8, 2012.
U.S. Appl. No. 12/937,104 Office Action dated Aug. 15, 2012.
Japanese Office Action for Application No. 2008-514914 dated Aug. 31, 2011, 6 pages.
English translation of DE10123207; Publication Date: Jul. 4, 2002; Country: DE; Inventar: Tietz Werner; Assignee: Audi NSU Auto Union AG.
German Patent Application No. 112009000827.5 Office Action dated Apr. 16, 2012 (English Translation and Original).
European Search Report for Application No. 12168676.0 dated Jun. 26, 2012.
U.S. Appl. No. 12/937,096 Office Action dated Aug. 24, 2012.
U.S. Appl. No. 12/955,491 Office Action dated Jun. 24, 2011.
Anonymous "Inflatable Bellows-Box Panel" Research Disclosure, Mason Publications, Hampshire, Great Britain, vol. 374, No. 9 (Jun. 1, 1995).
Canadian Patent Application No. 2,535,661 Notice of Allowance dated Feb. 1, 2010.
Canadian Patent Application No. 2,535,661 Office Action dated Jan. 20, 2009.
European Patent Application No. 04761769.1 Examination Report dated Mar. 23, 2007.
European Patent Application No. 04761769.1 Communication under Rule 71(3) EPC dated Jul. 1, 2009.
European Patent Application No. 04761769.1 Decision to Grant dated Nov. 19, 2009.
European Patent Application No. 04761769.1 Supplementary European Search Report dated Nov. 1, 2006.
European Patent Application No. 06771989.8 Supplementary European Search Report dated Feb. 8, 2010.
European Patent Application No. 06771989.8 Examination Report dated May 21, 2010.
European Patent Application No. 06804728.1 Communication under Rule 71(3) EPC dated Jun. 14, 2010.
European Patent Application No. 06804728.1 Examination Report dated Oct. 27, 2009.
European Patent Application No. 06804728.1 Response to European Examination Report dated Mar. 3, 2010.
European Patent Application No. 06804728.1 Supplementary European Search Report dated Jun. 15, 2009.
International Patent Application No. PCT/CA2004/001605 International Search Report dated Feb. 8, 2005.
International Patent Application No. PCT/CA2006/001862 International Preliminary Report on Patentability dated May 29, 2008.
International Patent Application No. PCT/CA2006/001862 International Search Report and Written Opinion dated Feb. 1, 2007.
International Patent Application No. PCT/CA2009/000475 International Search Report dated Jul. 7, 2009.
International Patent Application No. PCT/CA2009/000476 International Search Report and Written Opinion dated Jul. 28, 2009.
International Patent Application No. PCT/CA2009/000507 International Search Report dated Jul. 14, 2009.
International Patent Application No. PCT/US2006/021507 International Search Report and Written Opinion dated Oct. 26, 2006.
International Patent Application No. PCT/US2006/021507 International Preliminary Report on Patentability dated Dec. 6, 2007.
Japanese Patent Application No. 2006-525586 Office Action dated Apr. 6, 2010.
European Patent Application No. 06771989.8 Examination Report dated Feb. 2, 2011.
U.S. Appl. No. 13/100,785 Office Action dated Jun. 28, 2012 (10 pages).
U.S. Appl. No. 13/180,182 Office Action dated Dec. 21, 2012 (9 pages).
Office Action from the Korean Intellectual Property Office for Application No. 10-2007-7030970 dated Jan. 17, 2013 (14 pages).
International Search Report and Written Opinion of the International Searching Authority, International Patent Application No. PCT/CA2011/000518, mailed Aug. 11, 2011.
Office Action from the United States Patent and Trademark Office for U.S. Appl. No. 13/215,892 dated Apr. 16, 2013 (11 pages).

* cited by examiner

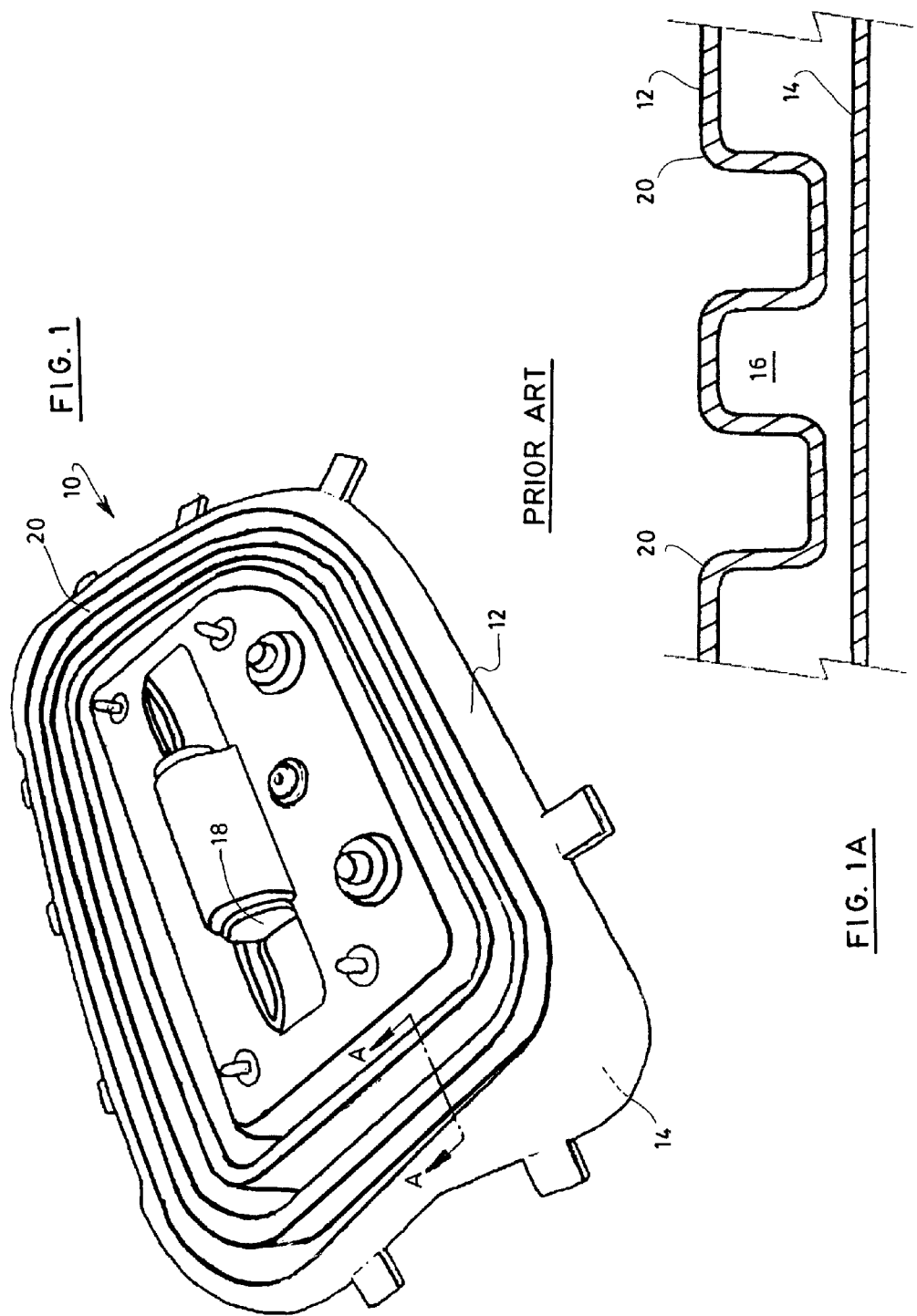

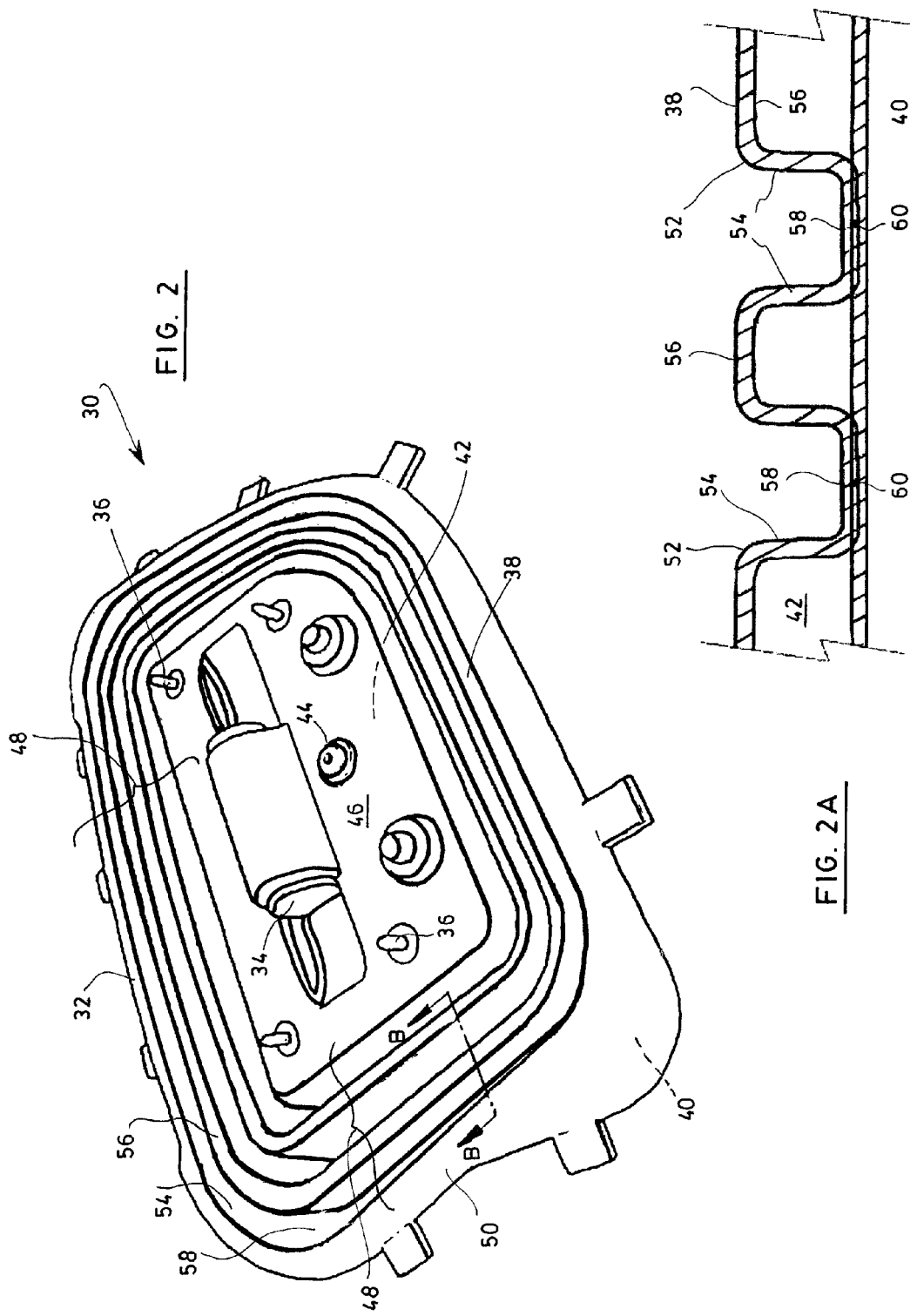

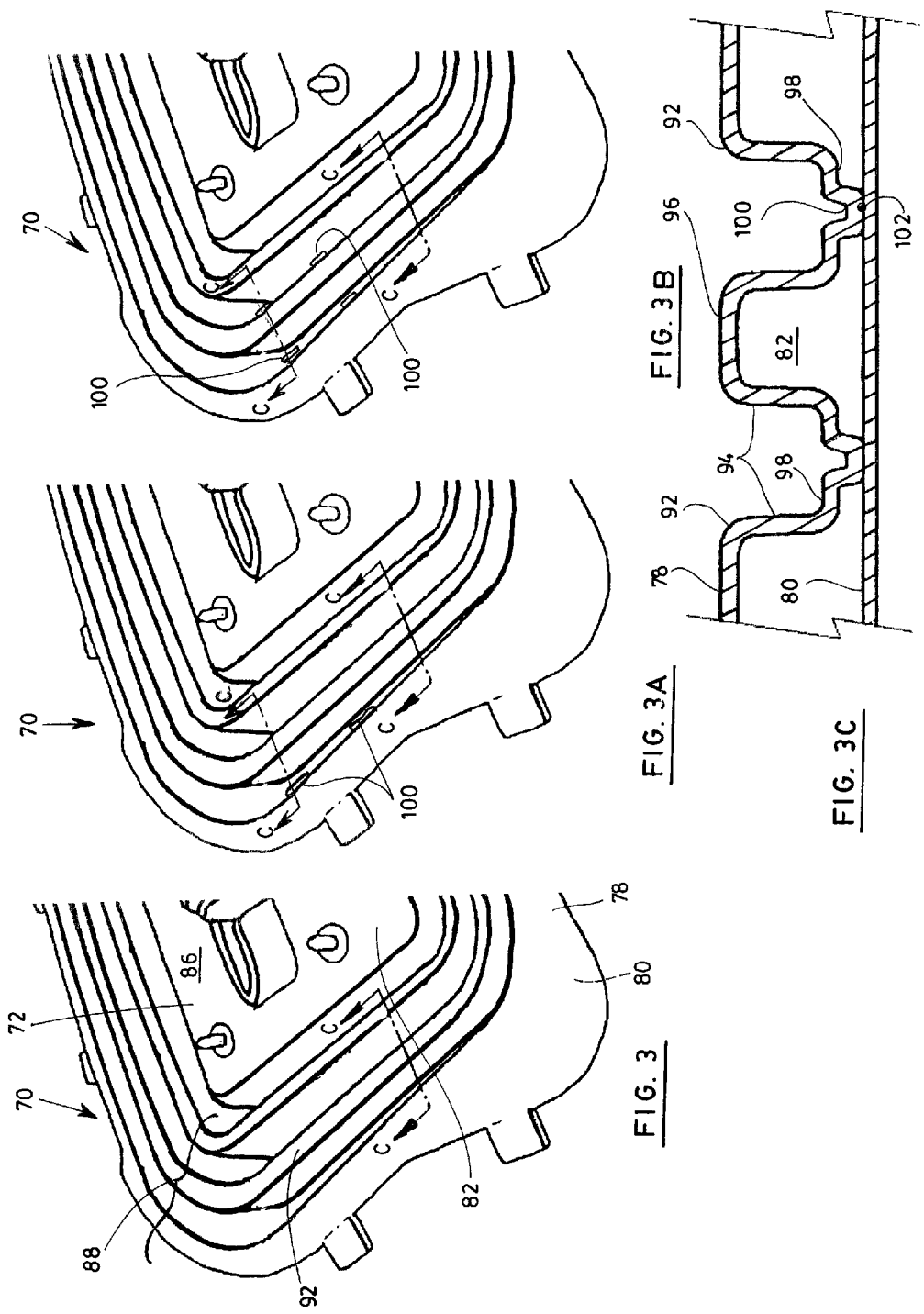

INFLATABLE BOLSTER

CROSS-REFERENCE TO RELATED APPLICATIONS

This patent application is a national stage filing under 35 U.S.C. 371 of International Application No. PCT/CA2009/000475, filed Apr. 14, 2009, which claims priority benefits to U.S. Provisional Application No. 61/044,294, filed Apr. 11, 2008, the entire contents of which are incorporated herein by reference.

FIELD OF THE INVENTION

The present invention relates generally to the field of safety devices for vehicles. More particularly, it concerns an inflatable bolster for use in the passenger compartment of a vehicle.

BACKGROUND OF THE INVENTION

Bolsters and the like are known in the art. A conventional bolster is mounted within a passenger compartment and includes a hollow body and an inflator for injecting a pressurized fluid into the hollow body. In order to reduce the potential for injuries caused during an impact event or the like, the inflator is activated upon detection of such an event and the bolster is inflated.

For example, the impact event may be a front, rear or side impact, a rollover, or any other event which is likely to cause a rapid change in the vehicle's momentum and thereby cause the occupant to strike some portion of the vehicle's passenger compartment. The fluid released by the inflator into the hollow body serves to inflate the bolster, bringing its outer surface closer to an occupant. By decreasing the distance between the occupant and its outer surface, the bolster can absorb more of the occupant's momentum over a longer period of time, thereby lessening the force experienced.

Bolsters may be provided as part of an instrument panel, a door panel, roof panel, a head rest, or other interior portion of the vehicle.

With reference to FIG. 1, an inflatable bolster 10 including several aspects of a conventional bolster is illustrated for exemplification purposes. In this example, a first wall 12 is mounted to the vehicle and a second wall 14 is exposed, facing the vehicle's passenger compartment. An inflator 18 is mounted to the bolster 10, which here is shown in an uninflated state.

In order to increase the volume of the inflated bolster 10, it is known to provide a plurality of pleats 18 formed in one of the first and second walls 12 and 14. When uninflated, the pleats 18 are folded and form a wave-like pattern as shown, for example, in FIG. 1A. During inflation, the pleats 18 can unfold and the bolster 10 is able to expand outward.

It has been found however that when such bolsters are in their folded, stored position, they can create a hollow sound when an occupant, for example, knocks, scrapes, touches, or otherwise makes contact with the wall facing the passenger compartment. It will be appreciated that a bolster's hollow body can behave somewhat like sound box and that a generally flat occupant facing wall may behave somewhat like a drum skin. Moreover, the occupant facing wall may be deflected inward, towards the opposing wall, and create a popping sound when released. Alternatively, as the vehicle, and hence the bolsters therewithin, vibrates, this can create a rattling sound. In addition, it will be appreciated that air holes in the bolster 10 could be another source of unwanted noise.

It will be appreciated that these unwanted acoustical effects can be irritating, distracting and/or give an impression of low quality. In addition, it will be appreciated that any crack in the surface finish or otherwise which might result from these unwanted vibrations could be undesirable.

It is known to stiffen bolsters by providing them with ribs which extend longitudinally across the bolster's body.

For example, U.S. Pat. No. 6,619,689 discloses a bolster having a pair of transverse strengthening ribs which are formed in an inner wall. These strengthening ribs extend inwards of the bolster's hollow body and engage an opposing outer wall.

It will be appreciated however that these while ribs strengthen the bolster, they will have little to no effect on the acoustical behavior of the bolster. The strengthening ribs engage the outer wall along two lines which extend across the center of the bolster. There remain, however, two large sections on either side of the ribs which may still create unwanted noise.

Also known in the art are the following patent and patent applications which disclose inflatable bolsters and the like: US 2007/0108747; U.S. Pat. Nos. 6,032,978; 6,203,057; 6,305,710; 6,517,103; 6,578,867; 6,758,493; 6,848,715; 6,976,706; 7,350,852; and WO 2006/132990.

None of these prior art patents adequately address the above-noted problems.

It would therefore be advantageous to provide an inflatable bolster which at least partially prevented such unwanted acoustical effects.

SUMMARY OF THE INVENTION

It is an object of the present invention to provide an inflatable bolster for use in a passenger compartment of a vehicle that satisfies at least one of the above-mentioned needs.

In accordance with an aspect of the present invention, that object is achieved with an inflatable bolster comprising a hollow body having a first wall devised to face a mating surface of the vehicle, the first wall having a central area and a circumferential area surrounding the central area, a second wall opposite the first wall and devised to face the passenger compartment, and an air chamber formed between the first and second walls. The inflatable bolster also comprises an inflator for injecting a pressurized fluid into the air chamber and thereby inflating the hollow body. The inflator is in communication with the hollow body. The inflatable bolster also comprises a plurality of concentric extension pleats formed in the first wall. The extension pleats extend around a major part of the circumferential area. The extension pleats contact the second wall at a plurality of contact points which are distributed across the second wall. The plurality of contact points is sufficient in number to at least partially suppress audible vibration of the second wall.

As can be appreciated, an inflatable bolster according to the above-mentioned aspect may advantageously at least partially prevent unwanted acoustical effects.

Further aspects and advantages of the present invention will be better understood upon reading of preferred embodiments thereof with respect to the appended drawings.

BRIEF DESCRIPTION OF THE DRAWINGS

FIG. 1 is a perspective view of an inflatable bolster incorporating several conventional aspects.

FIG. 1A is a cross-sectional of the prior art bolster taken along line A-A of FIG. 1.

FIG. 2 is a perspective view of an inflatable bolster according to a first preferred embodiment of the present invention.

FIG. 2A is a cross-sectional view taken along line B-B of FIG. 2.

FIG. 3 is a perspective view of an inflatable bolster according to a second embodiment of the present invention.

FIGS. 3A and 3B are perspective views of two variations of the inflatable bolster of FIG. 3.

FIG. 3C is a cross-sectional view taken along line C-C of FIGS. 3, 3A and 3B.

While the invention will be described in conjunction with example embodiments, it will be understood that it is not intended to limit the scope of the invention to such embodiments. On the contrary, it is intended to cover all alternatives, modifications and equivalents as may be included as defined by the present description and appended claims.

DESCRIPTION OF PREFERRED EMBODIMENTS

In the following description, similar features in the drawings have been given similar reference numerals and in order to lighten the figures, some elements are not referred to in some figures if they were already identified in a preceding figure.

With reference to FIG. 2, an inflatable bolster 30 according to a first preferred embodiment of the invention is illustrated. For the sake of clarity, the vehicle interior into which the bolster 30 is to be installed has not been shown. It will be appreciated however that the bolster 30 could be installed, or adapted to be installed, in a variety of places within the passenger compartment of a vehicle.

The bolster 30 comprises a hollow body 32 and an inflator 34 which is in communication therewith. Preferably, the inflator 34 is mounted to the exterior of the hollow body 32. The hollow body 32 is preferably molded from a suitable plastic material, such as a thermoplastic. More preferably, the hollow body 32 is made by extrusion blow molding, which is known in the art and will not be discussed further herein. The hollow body 32 comprises a first wall 38 and a second wall 40 which is opposite the first wall 38. An air chamber 42 is formed between the two opposite walls 18 and 20.

The hollow body 32 further comprises an attachment means 36 which is provided on the first wall 38. When installed, the attachment means 36 engage the vehicle's mating surface, such that the first wall 38 is hidden from view, while the second wall 40 faces the passenger compartment and any driver, passengers or otherwise therein. It will be appreciated that the expression mating surface should not be considered in a limiting manner, but rather should be considered to include all manner of structures, such as brackets and the like, to which the bolster 10 may be similarly mounted.

The inflator 34, as is known in the art, is typically provided as a cartridge, although it will be appreciated that various other types of inflators are within the scope of the present invention. The inflator 34 is in fluid communication with the air chamber 42 and able to inject a pressurized fluid, typically a gas, therewithin. When installed, the inflator 34 is linked to various vehicle sensors which detect impact events and the like and are operable to activate the inflator 34 accordingly. A fluid outlet 44 is also provided for releasing the pressurized fluid after it has inflated the hollow body 32.

The first wall 38 comprises a central area 46 where the inflator 34, the attachment means 36 and the fluid outlet 44 are preferably provided. The first wall 38 further comprises a circumferential area 48 which surrounds the central area 46. Preferably, the circumferential area 48 extends from the central area 46, outward to the circumferential edge 50 of hollow body 32 where the first and second walls 38 and 40 meet, although it will be appreciated that various other geometric arrangement are similarly within the scope of the present invention.

The bolster 30 is also provided a plurality of extension pleats 52 which are arranged concentrically in the circumferential area 48. These extension pleats 52 are operable to unfold during inflation, effectively expanding the circumferential area 48 as the pleats are unfolded, thereby pushing the second wall 40 away from the first wall 38 and the vehicle's mating surface, and into passenger compartment.

While the illustrated embodiment comprises a substantially rectangular bolster 10 and a plurality of concentric pleats 52 which surround completely the central area 46, various other geometrical arrangements are similarly possible. For example, a plurality of pleats 52 could be provided which extend around three of the four sides of the hollow body 32. In such an embodiment, the unpleated side would have a hinge-like effect on the expansion of the hollow body 32 during inflation. The second wall 40 would swing away from the first wall 38 while remaining pivoted thereto along the unpleated side. It will be appreciated that various other shaped bolsters and pleat arrangements could similarly be provided wherein the pleats 52 cover a major part of the circumferential area 48.

With additional reference to FIG. 2A, the pleats 52 comprise a substantially square wave-like shape formed by lateral sides 54 which separate upper and lower sides 56 and 58. It will be appreciated however that various other shapes of pleats may similarly be provided.

In the illustrated embodiment, the pleats 52 are provided with significant tack-off. As used herein, the expression "tack-off" refers to a portion of a molded hollow body which engages another opposing portion of the same molded hollow body. For clarity, this tack-off has been exaggerated. In the illustrated embodiment, the hollow body 32 is molded such that there is tack-off between the inside of the lower side 56 of the pleats 52 and the inside of the second wall 40.

The size of the lateral sides 54, i.e. the depth of the pleats 52, can be made longer than the nominal depth of the bolster, i.e. the distance between the first and second walls 38 and 40 over the non-pleated area. In this manner the pleats 52 have the added effect of creating a tension within the first and second walls 38 and 40. The depth of penetration off the tack off may also be adjusted in order to influence the retention strength and time of release during deployment of the bolster 30.

The tack-off forms a plurality of points of contact 60 which are distributed across the circumferential area 48 of the first wall 38 and a corresponding area of the second wall 40. The term "contact point" as used herein should not be considered as being limited to the mathematical definition of a "point", but rather be understood to encompass a relatively small contact area surrounding a central point. It will also be appreciated that a plurality of contact points can be combined so as to form a contact line. Again, this "line" should not be considered as being limited to the mathematical definition of a "line", but rather be understood to encompass a contact area having a relatively small width which extends longitudinally.

It is noted that if the first and second walls 38 and 40 are bonded at one or more of the points of contact 60, then work must be done to release these walls 38 and 40 from one another during inflation. It will be appreciated however that if, during molding, the lower side 58 of a given pleat 52 is pushed too into the second wall 40, then these two could become permanently bonded. Such bonding could prevent separation during inflation.

In the first preferred embodiment, the plurality of contact points 60 formed between the first and second walls 38 and 40 combine to form such a contact line. These contact lines are aligned concentrically as each pleat 52 touches the inside of the second wall.

With reference now to FIG. 3, an inflatable bolster 70 according to a second preferred embodiment of the invention is illustrated. The bolster 70 comprises a hollow body 72 which includes first and second opposing walls 78 and 80 and an air chamber 82 formed therebetween. The first wall 78 comprises a central area 86 and a circumferential area 88 which surrounds the central area 86. A plurality of concentric extension pleats 92 are formed around the circumferential area 86.

With additional reference to FIG. 3C, the pleats 92 similarly comprise lateral sides 94 which separate upper and lower sides 96 and 98. In contrast to the first embodiment, the lower sides 96 further comprise a protuberance 100 which extends downwards towards the second wall 80 and forms a contact point 102.

In FIG. 3, this protuberance 100 is provided along each pleat 92, thereby forming a contact line between each pleat 92 and the inside of the second wall 80. In contrast with the contact line formed in the previous embodiment, the protuberance 100 provides an area of contact which is relatively thinner than that which would be formed had the whole lower side 98 been in contact with the second wall 80. In certain applications, it may be desirable to provide relatively large pleats 92 but acceptable to provide a relatively small engagement with the second wall 80.

In FIGS. 3A and 3B, variations of the second preferred embodiment are illustrated. In each variation, the pleats 92 comprise the cross-section shown in FIG. 3C, but not across the entire length of the pleats 92. Rather, multiple protrusions 100 are provided along the pleats. Specifically, FIG. 3A provides plurality of elongated protrusions 100, while FIG. 3B provides a plurality of circular protrusions 100. The discreet lines or points of contact 102 may be provided at predetermined intervals along the pleats 92 as desired. It will be appreciated that in certain cases, a distributed array of contact points 102 may sufficiently address the acoustical concerns. It will further be appreciated that such an arrangement of contact points 102 will have less of an effect on the flow of pressurized fluid during inflation.

Conversely, it will be appreciated that in certain circumstances it may be desirable to influence fluid flow during inflation of the bolster 70.

It will also be appreciated that a combination of the first and second embodiments is also possible wherein the depth of the pleats 52 is varied and the tack-off between the bottoms side 58 and the second wall 40 is provided in discreet intervals.

As will be appreciated, the points of contact serve to at least partially stifle, dampen or otherwise suppress any audible vibration experience by the bolster's occupant facing wall. These points can be spread across the hollow body in order to suppress vibration in those portions which might be susceptible. Although they need not necessary be spread evenly across the entirety of such a susceptible portion, the contact points 60 or 102 are distributed in sufficient number to at least partially suppress audible vibration of the exposed, occupant facing wall. It will be appreciated that this number and distribution will vary according to each individual bolster's design and installation.

Although the present invention has been explained hereinabove by way of a preferred embodiment thereof, it should be understood that the invention is not limited to this precise embodiment and that various changes and modifications may be effected therein without departing from the scope of the invention.

The invention claimed is:

1. An inflatable bolster for use in a passenger compartment of a vehicle, the bolster comprising:
   a) a hollow body comprising
      i. a first wall devised to face a mating surface of the vehicle, the first wall having a central area and a circumferential area surrounding the central area,
      ii. a second wall opposite the first wall and devised to face the passenger compartment, and
      iii. an air chamber formed between the first and second walls;
   b) an inflator for injecting a pressurized fluid into the air chamber, thereby inflating the hollow body, the inflator being in communication with the hollow body; and
   c) a plurality of concentric extension pleats formed in the first wall, the extension pleats extending around a major part of the circumferential area, the extension pleats contacting the second wall at a plurality of contact points which are distributed across the second wall, each contact point forming a bond between the first and second walls, the plurality of contact points being sufficient in number to at least partially suppress audible vibration of the second wall.

2. The inflatable bolster of claim 1, wherein the plurality of points form a plurality of contact lines along each extension pleat.

3. The inflatable bolster of claim 1, wherein the extension pleats comprise a depth, the depth creating tack-off.

4. An inflatable bolster for use in a passenger compartment of a vehicle, the bolster comprising:
   a) a hollow body comprising
      i. a first wall devised to face a mating surface of the vehicle, the first wall having a central area and a circumferential area surrounding the central area,
      ii. a second wall opposite the first wall and devised to face the passenger compartment, and
      iii. an air chamber formed between the first and second walls;
   b) an inflator for injecting a pressurized fluid into the air chamber, thereby inflating the hollow body, the inflator being in communication with the hollow body; and
   c) a plurality of concentric extension pleats formed in the first wall, the extension pleats extending around a major part of the circumferential area, the extension pleats contacting the second wall at a plurality of contact points which are distributed across the second wall, the plurality of contact points being sufficient in number to at least partially suppress audible vibration of the second wall, wherein each extension pleat comprises a pair of side walls separated by a bottom wall, the bottom wall comprising a protuberance extending from the bottom wall towards the second wall, the protuberance comprising a one of the plurality of contact points.

5. An inflatable bolster for use in a passenger compartment of a vehicle, the bolster comprising:
   a) a hollow body comprising
      i. a first wall devised to face a mating surface of the vehicle, the first wall having a central area and a circumferential area surrounding the central area,
      ii. a second wall opposite the first wall and devised to face the passenger compartment, and iii. an air chamber formed between the first and second walls;
b) an inflator for injecting a pressurized fluid into the air chamber, thereby inflating the hollow body, the inflator being in communication with the hollow body; and
c) a plurality of concentric extension pleats formed in the first wall, the extension pleats extending around a major part of the circumferential area, the extension pleats contacting the second wall at a plurality of contact points which are distributed across the second wall, the plurality of contact points being sufficient in number to at least partially suppress audible vibration of the second wall,
wherein each extension pleat comprises a plurality of discreet protuberances.

* * * * *

UNITED STATES PATENT AND TRADEMARK OFFICE
CERTIFICATE OF CORRECTION

PATENT NO. : 8,544,876 B2  Page 1 of 1
APPLICATION NO. : 12/937100
DATED : October 1, 2013
INVENTOR(S) : Best et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 333 days.

Signed and Sealed this

Fifteenth Day of September, 2015

Michelle K. Lee
*Director of the United States Patent and Trademark Office*